(12) United States Patent
Jiang et al.

(10) Patent No.: US 11,086,446 B2
(45) Date of Patent: Aug. 10, 2021

(54) TOUCH DETECTION METHOD, TOUCH CHIP AND ELECTRONIC DEVICE

(71) Applicant: Shenzhen Goodix Technology Co., Ltd., Guangdong (CN)

(72) Inventors: Hong Jiang, Shenzhen (CN); Guangkai Yuan, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/866,409

(22) Filed: May 4, 2020

(65) Prior Publication Data

US 2020/0264754 A1 Aug. 20, 2020

Related U.S. Application Data

(63) Continuation of application No. PCT/CN2018/121558, filed on Dec. 17, 2018.

(51) Int. Cl.
*G06F 3/041* (2006.01)
(52) U.S. Cl.
CPC ................. *G06F 3/04166* (2019.05)
(58) Field of Classification Search
None
See application file for complete search history.

(56) References Cited

U.S. PATENT DOCUMENTS

| 2011/0063249 | A1 | 3/2011 | Chou et al. |
| 2012/0194469 | A1 | 8/2012 | Wang et al. |
| 2014/0198053 | A1 | 7/2014 | Yoon et al. |
| 2019/0302928 | A1 | 10/2019 | Yuan et al. |

FOREIGN PATENT DOCUMENTS

| CN | 103257738 | A | 8/2013 |
| CN | 104238843 | A | 12/2014 |
| CN | 108475155 | A | 8/2018 |
| EP | 3640780 | A1 | 4/2020 |

OTHER PUBLICATIONS

Shenzhen Goodix Technology Co., Ltd., Extended European Search Report, EP 18935995.3, dated Oct. 6, 2020, 10 pgs.
International Search Report, PCT/CN2018/121558, dated Dec. 17, 2018, 5 pgs.

*Primary Examiner* — Aneeta Yodichkas
(74) *Attorney, Agent, or Firm* — USCH Law, PC (57) ABSTRACT

The present disclosure relates to touch technology, and provides a touch detection method, a touch chip, and an electronic device. The touch detection method includes applying a driving signal to a driving channel of a touch screen, where the driving signal is encoded based on a preset encoding mode and includes a plurality of signal waveforms divided into waveforms in at least one correlated double sampling cycle. The same correlated double sampling cycle includes two sampling cycles and there is a phase difference of 180° between a waveform in one sampling cycle and that in the other sampling cycle. The touch detection method further includes receiving a sensing signal that corresponds to the driving signal and that is from a sensing channel of the touch screen; and determining a touch position information according to the sensing signal and according to an encoding information corresponding to the encoding mode.

19 Claims, 10 Drawing Sheets

|    | TX1 | TX2 | TX3 | TX4 |
|----|-----|-----|-----|-----|
| T0 | −   | +   | +   | +   |
| T1 | +   | −   | +   | +   |
| T2 | +   | +   | −   | +   |
| T3 | +   | +   | +   | −   |

|   |    | TX1 | TX2 | TX3 | TX4 |
|---|----|-----|-----|-----|-----|
| T0 | 01 | -   | +   | +   | +   |
|    | 02 | +   | -   | -   | -   |
| T1 | 11 | +   | -   | +   | +   |
|    | 12 | -   | +   | -   | -   |
| T2 | 21 | +   | +   | -   | +   |
|    | 22 | -   | -   | +   | -   |
| T3 | 31 | +   | +   | +   | -   |
|    | 32 | -   | -   | -   | +   |

|  |  | TX1 | TX2 | TX3 | TX4 |
|---|---|---|---|---|---|
| T0 | 01 | - | + | + | + |
|  | 02 | + | - | - | - |
|  | 03 | + | - | - | - |
|  | 04 | - | + | + | + |
| T1 | 11 | + | - | + | + |
|  | 12 | - | + | - | - |
|  | 13 | - | + | - | - |
|  | 14 | + | - | + | + |
| T2 | 21 | + | + | - | + |
|  | 22 | - | - | + | - |
|  | 23 | - | - | + | - |
|  | 24 | + | + | - | + |
| T3 | 31 | + | + | + | - |
|  | 32 | - | - | - | + |
|  | 33 | - | - | - | + |
|  | 34 | + | + | + | - |

TOUCH DETECTION METHOD, TOUCH CHIP AND ELECTRONIC DEVICE

CROSS-REFERENCE TO RELATED APPLICATION

This application is a continuation of PCT Application No. PCT/CN2018/121558, filed on Dec. 17, 2018, which is hereby incorporated by reference in its entirety.

TECHNICAL FIELD

The present disclosure relates to touch technology, in particular to a touch detection method, a touch chip, and an electronic device.

BACKGROUND

A multi-channel encoding detection mode or a single-channel detection mode is usually adopted to detect touches on existing capacitive touch screens. When there is a finger touch, a capacitance value of a capacitance sensing node at a position corresponding to the finger touch will change. A touch chip can determine the position corresponding to the finger touch by detecting the change of the capacitance value in real time, thereby generating a touch event corresponding to the finger touch.

The inventors of the present application found that there are at least the following problems in existing technologies: the existing multi-channel encoding detection mode or single-channel detection mode is easily affected by a low-frequency interference, resulting in low sensitivity of a touch detection.

SUMMARY

An objective of some embodiments of the present disclosure is to provide a touch detection method, a touch chip and an electronic device, which can improve an ability in anti low-frequency interference in a touch detection process, thereby improving a signal-to-noise ratio of a system and enhancing a touch sensitivity.

An embodiment of the present disclosure provides a touch detection method, which includes: applying a driving signal encoded to a driving channel of a touch screen, wherein the driving signal is encoded based on a preset encoding mode and includes a plurality of signal waveforms divided into waveforms in at least one correlated double sampling cycle, the same correlated double sampling cycle including two sampling cycles with a phase difference of 180° between a waveform in one sampling cycle and that in the other sampling cycle; receiving a sensing signal that corresponds to the driving signal and that is from a sensing channel of the touch screen; and determining a touch position information according to the sensing signal and according to an encoding information corresponding to the encoding mode.

An embodiment of the present disclosure further provides a touch chip, which includes: a driving unit, configured to apply a driving signal to a driving channel of a touch screen, wherein the driving signal is encoded based on a preset encoding mode and includes a plurality of signal waveforms divided into waveforms in at least one correlated double sampling cycle, the same correlated double sampling cycle including two sampling cycles with a phase difference of 180° between a waveform in one sampling cycle and that in the other sampling cycle; a receiving unit, configured to receive a sensing signal that corresponds to the driving signal and that is from a sensing channel of the touch screen; and a processing unit, configured to determine a touch position information according to the sensing signal and according to an encoding information corresponding to the encoding mode.

An embodiment of the present disclosure further provides an electronic device which includes: a touch screen and the above touch chip.

Compared with existing technologies, a plurality of signal waveforms of a driving signal are divided into waveforms in at least one correlated double sampling cycle in embodiments of the present disclosure, the same correlated double sampling cycle including two sampling cycles with a phase difference of 180° between a waveform in one sampling cycle and that in the other sampling cycle. Those skilled in the art should know that the low-frequency interference signal can be considered to remain unchanged during a touch detection process since a touch detection time is relatively short. In addition, those skilled in the art should also know that the sensing signal includes a target signal (i.e. a coupling signal of the driving signal) and the low-frequency interference signal, the target signal has a phase shift with respect to the driving signal, and a phase shift difference between a waveform of the target signal and a waveform of the driving signal at the same time remains unchanged. In the embodiment of the present disclosure, since in the two sampling cycles in one correlated double sampling cycle there is a phase difference of 180° between the waveform of the driving signal in one sampling cycle and that in the other sampling cycle, then with respect to the sensing signal sampled in the two sampling cycles, a phase difference of 180° between the waveform of the target signal in one sampling cycle and that in the other sampling cycle remains unchanged, and the phase of the low-frequency interference signal in each of the two sampling cycles is the same, thus the low-frequency interference signals in the two sampling cycles in the same correlated double sampling cycle may be cancelled by calculation, thereby improving the ability in anti low-frequency interference in the touch detection process, and improving the signal-to-noise ratio of the system and enhancing the touch sensitivity.

Further, in the two sampling cycles in the same correlated double sampling cycle, the number of signal cycles in one sampling cycle is equal to that in the other sampling cycle, where one of the signal cycles corresponds to one of the signal waveforms. In this embodiment, the number of signal cycles in each of the two sampling cycles is equal, that is, a time length of the waveform in each of the two sampling cycles is the same, so that the low-frequency interferences signals in the signal sampled in the two sampling cycles may be completely cancelled as much as possible.

Further, the plurality of signal waveforms are divided into waveforms in one correlated double sampling cycle. This embodiment provides a specific implementation.

Further, the plurality of signal waveforms are divided into waveforms in a plurality of correlated double sampling cycles, and the number of the signal cycles in each of the sampling cycles in each of the correlated double sampling cycles is equal. In addition, the number of the signal cycles in each of the sampling cycles in each of the correlated double sampling cycles is 1. This embodiment provides another specific implementation. For the same driving signal (including the same number of signal waveforms), the larger the number of the correlated double sampling cycles are divided into, the more accurately the low-frequency interference signal in the sensing signal may be cancelled in the calculation process of the touch position information, that is, the stronger the ability in anti low-frequency interference.

BRIEF DESCRIPTION OF THE DRAWINGS

One or more embodiments are described as examples with reference to the corresponding figures in accompanying drawings, and the described examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

In order to make objectives, technical solution and advantages of the present disclosure clearer, some embodiments of the present disclosure will be explained below in detail with reference to accompanying drawings and embodiments. It should be understood that the specific embodiments described here only explain the disclosure but do not constitute a limitation to the disclosure.

Figure 1:
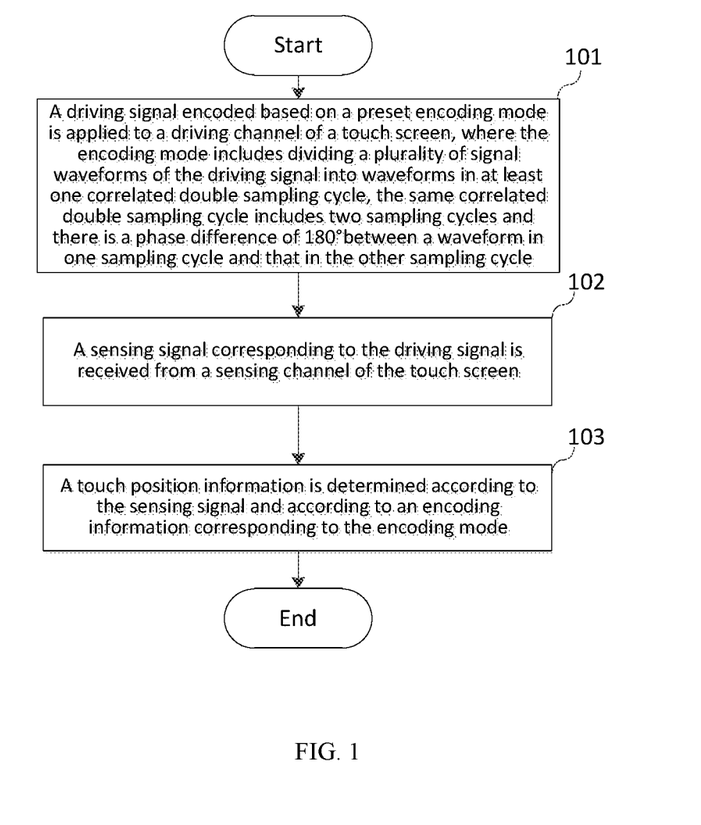
FIG. 1 is a flowchart of a touch detection method in accordance with a first embodiment of the present disclosure.

A first embodiment of the present disclosure relates to a touch detection method, as shown in FIG. 1, which includes the following steps:

In step S101, a driving signal is applied to a driving channel of a touch screen, wherein the driving signal is encoded based on a preset encoding mode and includes a plurality of signal waveforms divided into waveforms in at least one correlated double sampling cycle, the same correlated double sampling cycle including two sampling cycles and there is a phase difference of 180° between a waveform in one sampling cycle and that in the other sampling cycle.

In step S102, a sensing signal corresponding to the driving signal is received from a sensing channel of the touch screen.

In step S103, a touch position information is determined according to the sensing signal and according to an encoding information corresponding to the encoding mode.

Compared with existing technologies, a plurality of signal waveforms of a driving signal are divided into waveforms in at least one correlated double sampling cycle in embodiments of the present disclosure, the same correlated double sampling cycle including two sampling cycles with a phase difference of 180° between a waveform in one sampling cycle and that in the other sampling cycle. Those skilled in the art should know that the low-frequency interference signal may be considered to remain unchanged during a touch detection process since a touch detection time is relatively short. In addition, those skilled in the art should also know that the sensing signal includes a target signal (i.e. a coupling signal of the driving signal) and the low-frequency interference signal, the target signal has a phase shift with respect to the driving signal, and a phase shift difference between a waveform of the target signal and a waveform of the driving signal at the same time remains unchanged. In the embodiment of the present disclosure, since in the two sampling cycles in one correlated double sampling cycle there is a phase difference of 180° between the waveform of the driving signal in one sampling cycle and that in the other sampling cycle, then in the sensing signal sampled in the two sampling cycles, a phase difference of 180° between the waveform of the target signal in one sampling cycle and that in the other sampling cycle remains unchanged, and the phase of the low-frequency interference signal in each of the two sampling cycles is the same, thus the low-frequency interference signals in the two sampling cycles in the same correlated double sampling cycle may be cancelled by calculation, thereby improving an ability in anti low-frequency interference in the touch detection process, and improving a signal-to-noise ratio of a system and enhancing a touch sensitivity.

The implementation details of the touch detection method in this embodiment will be described in detail below. The following contents are only the implementation details for facilitating a better understanding of the present disclosure, and are not necessary for implementing this solution.

Figure 2:
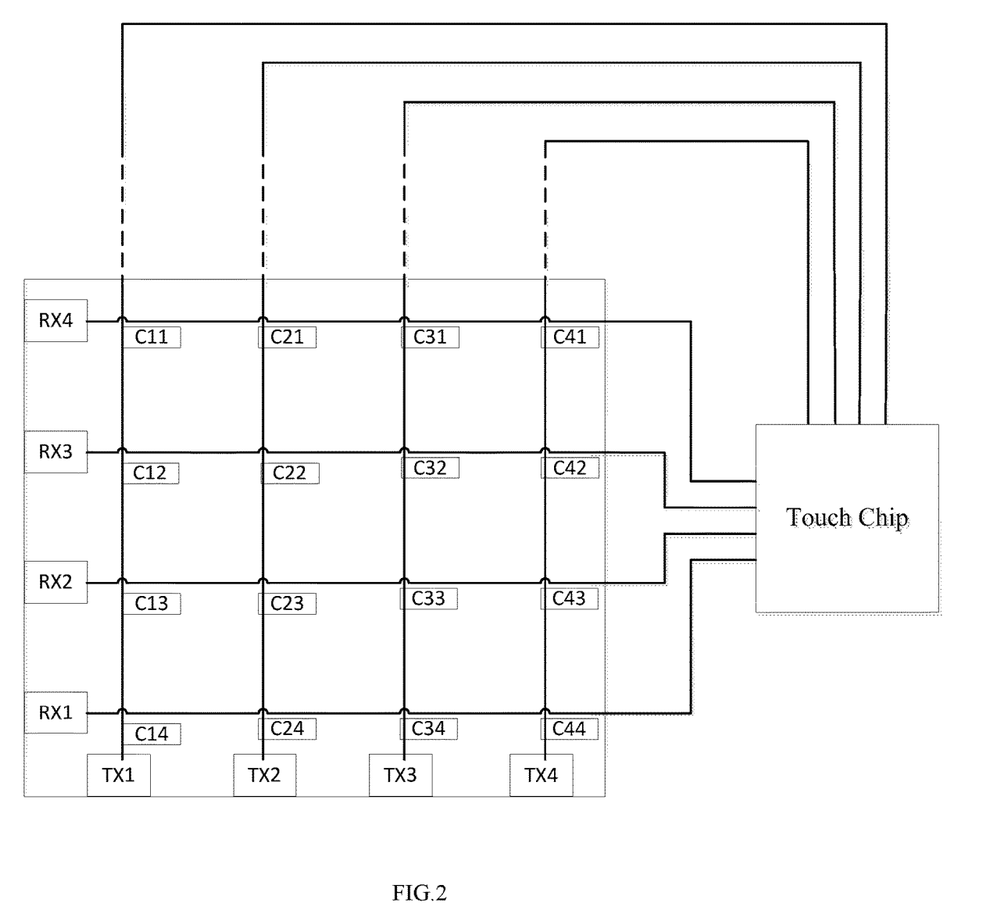
FIG. 2 is a schematic diagram of a touch screen on which a touch detection can be performed using the touch detection method in accordance with the first embodiment.

The touch detection method in this embodiment may be configured to perform touch detection on a mutual-capacitance or a self-capacitance touch screen. FIG. 2 is a schematic diagram of a touch screen on which a touch detection may be performed using the touch detection method in this embodiment. The touch screen in FIG. 2 includes a driving layer and a sensing layer (not shown). The driving layer includes four driving channels arranged in parallel along a first direction, and the sensing layer includes four sensing channels arranged in parallel along a second direction. In this embodiment, the first direction is perpendicular to the second direction. A coupling capacitance $C_{ij}$ is formed at an intersection of each driving channel and each sensing channel, where $1 \leq i \leq 4$, $1 \leq j \leq 4$, and i and j are both positive numbers. A value of the coupling capacitance $C_{ij}$ may indicate a touch condition of the touch position where the intersection is located. 4 driving channels and 4 sensing channels are respectively connected to a touch chip. The touch chip is configured to apply the driving signal to the driving channel and to receive the sensing signal from the sensing channel. This embodiment and the following embodiments are all illustrated by taking the touch screen in FIG. 2 as an example. However, it should be noted that FIG. 2 only illustrates a 4*4 mutual-capacitance touch screen, but the embodiments of the present disclosure do not limit the number of driving channels and sensing channels in the touch screen. Further, the touch detection method in the embodiment of the present disclosure may also be applied to a self-capacitance touch screen, and when applied to the self-capacitance touch screen, the driving channel and the sensing channel are the same channel.

In step S101, the driving signal applied to the driving channel may last for at least one preset time period, or may also last for a plurality of preset time periods, and the driving signal in each preset time period includes a plurality of signal waveforms. That is, the plurality of signal waveforms of the driving signal are divided into waveforms in at least one correlated double sampling cycle, the same correlated double sampling cycle including two sampling cycles with a phase difference of 180° between a waveform in one sampling cycle and that in the other sampling cycle, which may be understood as: the plurality of signal waveforms of the driving signal in one preset time period are divided into waveforms in at least one correlated double sampling cycle, the same correlated double sampling cycle including two sampling cycles with a phase difference of 180° between a waveform in one sampling cycle and that in the other sampling cycle.

It should be noted that, since there are only four driving channels in the example of FIG. 2, driving signals are applied to the four driving channels at the same time. That is, based on the example of FIG. 2, the encoding mode in the touch detection method may be formed by combining an all-channel encoding mode and a correlated double sampling principle. However, this embodiment does not impose any limitation on this. In other examples, the encoding mode may be formed by combining a multi-channel encoding mode and the correlated double sampling principle, or may be formed by combining a single-channel encoding mode and the correlated double sampling principle. For example, for a 16*16 mutual-capacitance touch screen, 16 driving channels may be divided into four groups, each group has 4 of 16 driving channels, and driving signals may be sequentially applied to the four driving channels in each group (i.e., formed by combining the multi-channel encoding mode and the correlated double sampling principle).

In step S102, the touch chip receives the sensing signal from the sensing channel during the process of applying the driving signal to the driving channel. Corresponding to FIG. 2, the touch chip applies the driving signals to the four driving channels at the same time and receives the sensing signals from the four sensing channels during the process of applying the driving signals.

Figure 3:
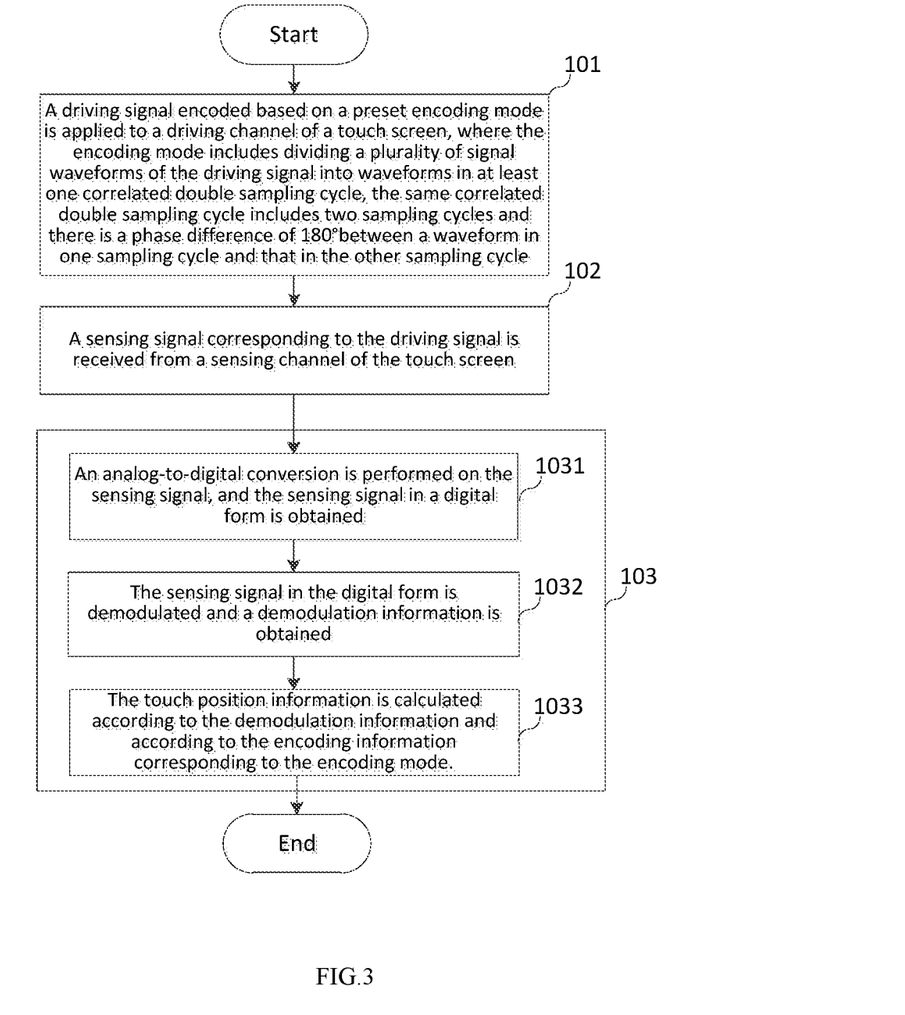
FIG. 3 is a specific flowchart of a touch detection method in accordance with the first embodiment of the present disclosure.

As shown in FIG. 3, step S103 includes the following sub-steps:

In sub-step S1031, an analog-to-digital conversion is performed on the sensing signal, and the sensing signal in digital form is obtained.

Specifically, the sensing signal and the driving signal have the same signal cycle. Firstly, the digital conversion is performed on the signal waveforms of the sensing signal in a plurality of signal cycles to obtain digital signals corresponding to the plurality of signal waveforms, that is, the sensing signals in the digital form. For example, if the driving signal includes the signal waveforms in 2N signal cycles, the sensing signal also includes the signal waveforms in 2N signal cycles.

In sub-step S1032, the sensing signal in the digital form is demodulated and a demodulation information is obtained, where the waveform in each of the sampling cycles corresponds to one demodulation value in the demodulation information.

Specifically, the sampling cycle above-mentioned is the sampling cycle of the sensing signal. During a demodulation process, the sensing signal is sampled according to the sampling cycle, so that one demodulation value corresponding to the waveform in each of the sampling cycles may be obtained. Assuming that one sampling cycle includes x signal cycles, the waveform in x signal cycles may be demodulated to obtain one demodulated value, where x is an integer greater than or equal to 1. For each sensing channel, the waveforms of the received sensing signal in each correlated double sampling cycle may obtain two demodulation values, that is, the sensing signal received by each sensing channel may contain at least two demodulation values. Therefore, the demodulation information includes a plurality of demodulation values, and the plurality of demodulation values may form a demodulation matrix R, that is, the demodulation information may be represented by the demodulation matrix R. In this embodiment, quadrature demodulation mode is used, but this embodiment is not limited thereto.

In sub-step S1033, the touch position information is calculated according to the demodulation information and according to the encoding information corresponding to the encoding mode.

Specifically, the touch position information may be characterized by a value of the coupling capacitance $C_{ij}$ (as described above, the coupling capacitance $C_{ij}$ is formed at the intersection of each driving channel and each sensing channel), and the values of a plurality of coupling capacitances $C_{ij}$ may form a capacitance matrix C, that is, the touch position information may be represented by the capacitance matrix C.

In this embodiment, the encoding information preset in the touch chip corresponds to the encoding mode. Specifically, the encoding information includes a plurality of encoding values, and each encoding value represents a phase condition of the driving signal applied to a certain driving channel in a certain sampling cycle. The plurality of encoding values may form an encoding matrix A, that is, the encoding information may be represented by the encoding matrix A. Those skilled in the art should know that the demodulation matrix R=AC, and therefore, the capacitance matrix $C=A^{-1}R$, thus the touch position information may be calculated.

The following is a specific comparison between the touch detection method in this embodiment and a conventional touch detection method based on the touch screen shown in FIG. 2 to reflect a difference more intuitively.

Figure 4:
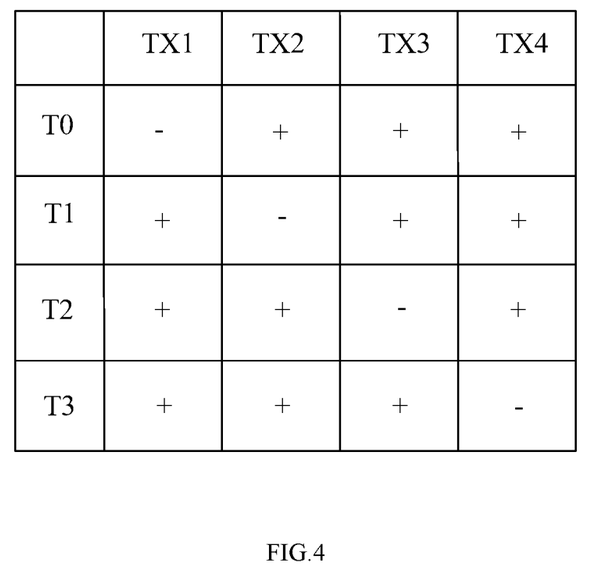
FIG. 4 is a schematic diagram of an encoding information when a conventional encoding detection method is adopted for the touch screen in FIG. 2.

FIG. 4 is a schematic diagram of the encoding information when a conventional encoding detection method is adopted for the touch detection on the touch screen in FIG. 2. Here, the encoding information in FIG. 4 reflects a phase change of the driving signal in different time periods. In FIG. 4, the driving channels TX1 to TX4 are shown in the lateral direction and four preset time periods T0 to T3 are shown in the longitudinal direction. As may be seen from the encoding information shown in FIG. 4, each group of the driving channel is allocated four consecutive time periods T0 to T3 during which driving signals are applied to each group of the driving channels. In this embodiment, a length of each of the time periods T0 to T3 is equal, but it is not limited thereto.

The signal waveform of the driving signal may be, for example, a sine wave. "+" indicates that a starting phase of the sine wave is 0°, which is called a positive code. "−" indicates that the starting phase of the sine wave is 180°, which is called a negative code. The driving signal applied to the driving channel in each time period is the positive code or the negative code, and the driving signal applied in each time period includes the sine waves in the plurality of signal cycles, and the starting phase of the sine wave in each of the plurality of signal cycles is the same (both are positive codes and both are negative codes). It should be noted that "+" indicates that the starting phase of the sine wave is 0°, and "−" indicates that starting phase of the sine wave is 180°, but this embodiment is not limited to thereto. In other examples, "−" may be used to indicate that the starting phase of the sine wave is 0°, and "+" indicates that starting phase of the sine wave is 180°. Alternatively, the positive code and the negative code need not be divided into 00 and 180°, but may be other degrees as long as the phase difference between the positive code and the negative code is 180°. Further, the signal waveform of the driving signal is not limited to the sine wave, but may also be a square wave, a triangular wave, or the like.

Figure 5:
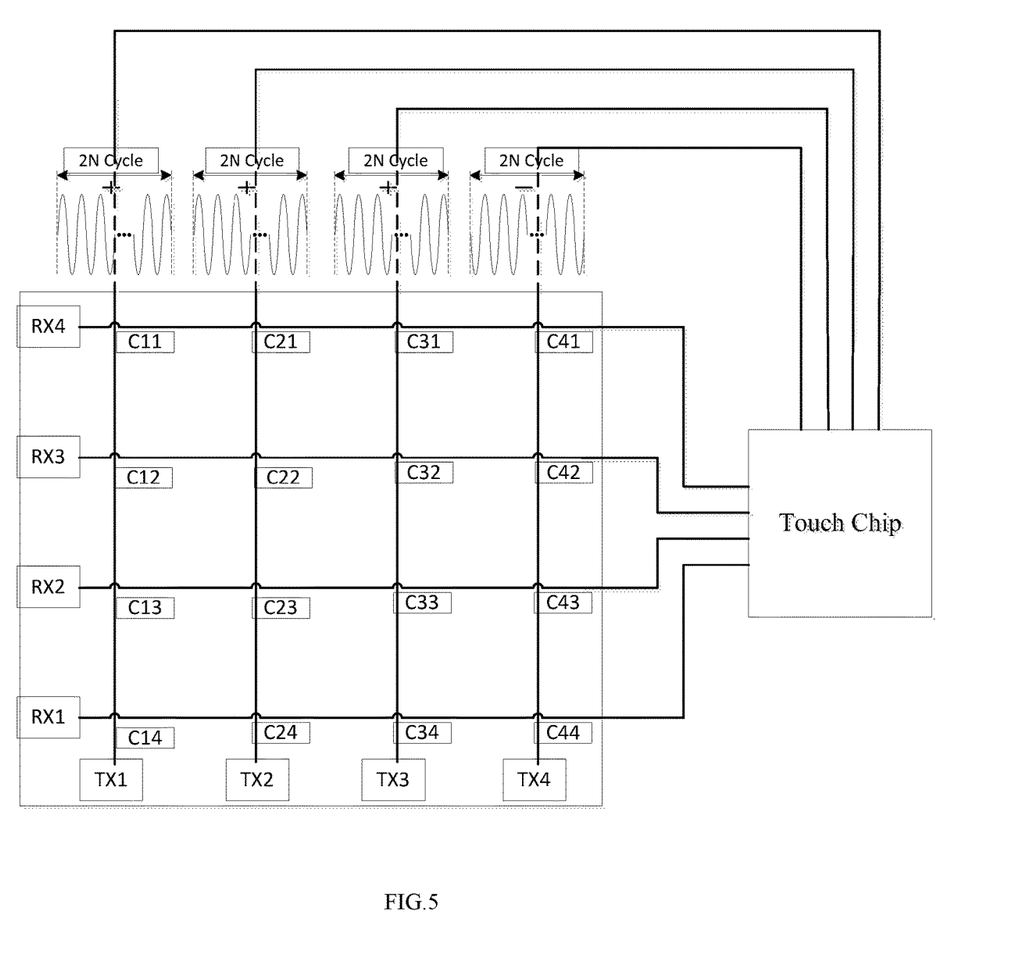
FIG. 5 is a schematic waveform diagram of a driving signal corresponding to the encoding information in FIG. 4.

FIG. 5 is a schematic waveform diagram of the driving signal in FIG. 4 and shows the waveform of the driving signal in the time period T3. As shown in FIG. 5, the time period T3 includes the sine wave in 2N signal cycles. In this embodiment, the length of each time period is equal, that is, each time period includes the waveforms in 2N signal cycles, where the N is an integer greater than or equal to 1. As shown in the encoding information in FIG. 4, during the time period T3, the driving signals applied to the driving channels TX1, TX2, TX3, TX4 are "+", "+", "+", "−", respectively. The signal waveforms above the driving channels TX1, TX2, TX3, TX4 in FIG. 5 represent the signal waveforms of the driving signals applied to the driving channels TX1, TX2, TX3, TX4, respectively. It may be seen that for the three driving channels TX1, TX2 and TX3, the starting phase of each sine wave in the driving signal is 0°, and for the driving channel TX4, the starting phase of each sine wave in the driving signal is 180°.

As follows, the encoding matrix A may represent the encoding information of TX1 to TX4 in the above conventional encoding detection method. The encoding matrix A includes a plurality of encoding values Aij (i.e., A11, A12, A13, A14, A21, A22, ... ), where the i in Aij represents the i-th time period, the j represents the j-th TX channel, and the value ranges of i and j in the Aij are 0≤i≤3, 1≤j≤4;

$$A = \begin{bmatrix} A01 & A02 & A03 & A04 \\ A11 & A12 & A13 & A14 \\ A21 & A22 & A23 & A24 \\ A31 & A32 & A33 & A34 \end{bmatrix}$$

In this example, if the driving signal is "+", the corresponding coding value is "1". If the driving signal is "−", the corresponding code value is "−". The specific values of A are as follows:

$$A = \begin{bmatrix} -1 & 1 & 1 & 1 \\ 1 & -1 & 1 & 1 \\ 1 & 1 & -1 & 1 \\ 1 & 1 & 1 & -1 \end{bmatrix}$$

The $C_{ij}$ in the capacitance matrix C (i.e., C11, C12, C13, C14, C21, C22, ... ) represents the value of the coupling capacitance $C_{ij}$ formed at the intersection of each driving channel and each sensing channel in FIG. 1, and the value ranges of i and j in the $C_{ij}$ are 0≤i≤3, 1≤j≤4;

$$C = \begin{bmatrix} C11 & C12 & C13 & C14 \\ C21 & C22 & C23 & C24 \\ C31 & C32 & C33 & C34 \\ C41 & C42 & C43 & C44 \end{bmatrix}$$

The demodulation matrix R represents demodulation information:

$$R = \begin{bmatrix} R01 & R02 & R03 & R04 \\ R11 & R12 & R13 & R14 \\ R21 & R22 & R23 & R24 \\ R31 & R32 & R33 & R34 \end{bmatrix}$$

The demodulation matrix R includes a plurality of demodulation values Rij (i.e., R01, R02, R03, R04, R11, R12, R13, R14, ... ), where the i in Rij represents the i-th time period, the j represents the j-th RX channel, and the value ranges of i and j in the Rij are 0≤i≤3, 1≤j≤4. Here, the sensing signal of each sensing channel in each time period respectively corresponds to one demodulation value. For example, the sensing channel RX1 corresponds to R01, R02, R03 and R04 respectively in the time period T0, T1, T2 and T3.

Since the demodulation matrix R=AC,

Therefore, a capacitance matrix $C=A^{-1}R$ may be obtained.

The capacitance matrix C represents the detected touch position information of the touch screen in FIG. 2.

Figure 6:
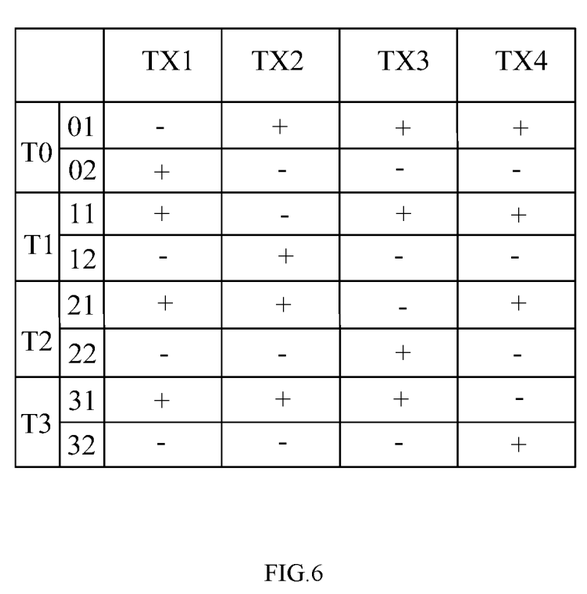
FIG. 6 is a schematic diagram of encoding information corresponding to an encoding mode in the touch detection method in accordance with the first embodiment of the present disclosure.
Figure 7:
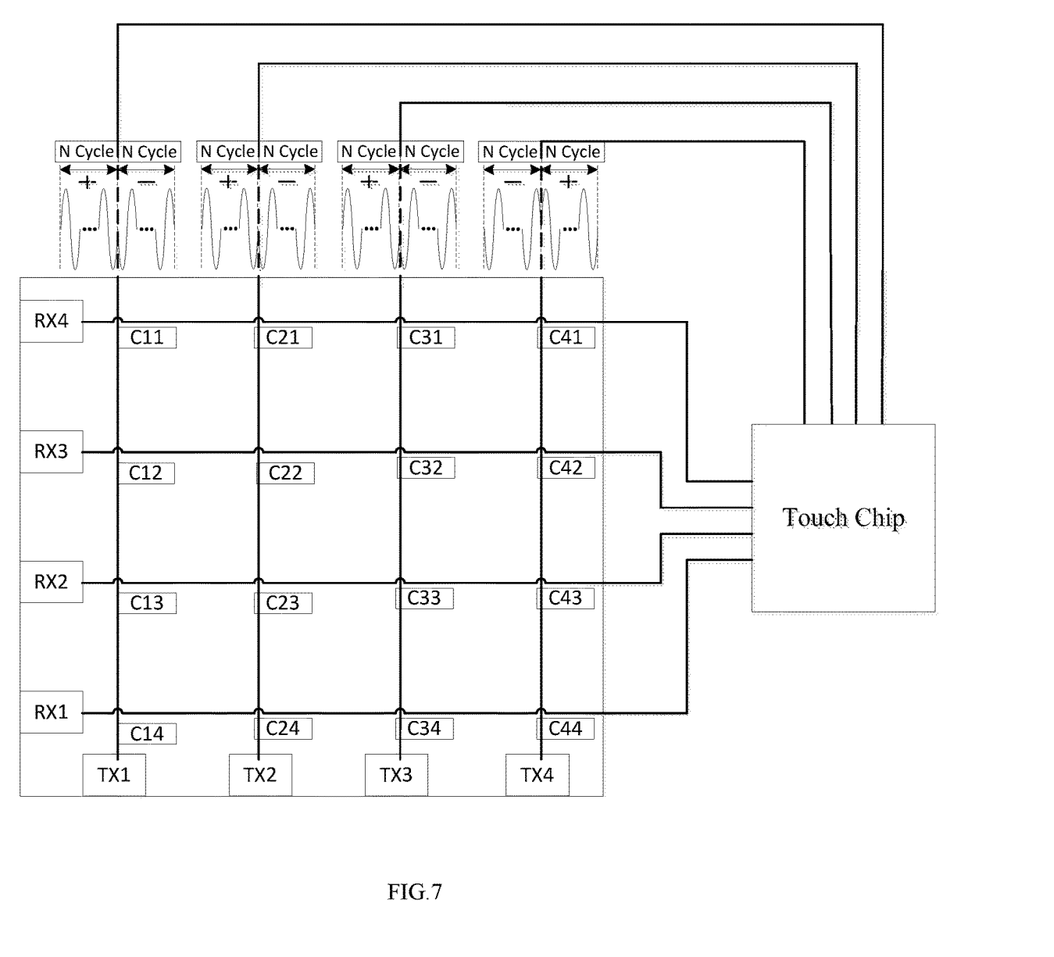
FIG. 7 is a schematic waveform diagram of a driving signal corresponding to the encoding information in FIG. 6.

FIG. 6 shows the encoding information corresponding to the encoding mode in the touch detection method in this embodiment. FIG. 7 is a schematic waveform diagram of the driving signal corresponding to the encoding information in FIG. 6 and shows the waveform of the driving signal in the time period T3.

In this embodiment, the 2N signal cycles in each time period are divided into one correlated double sampling cycle, which includes two sampling cycles, and the number of the signal cycles in each of the two sampling cycles is equal. That is, the first N signal cycles in the 2N signal cycles are taken as one sampling cycle, and the second N signal cycles are taken as the other sampling cycle, and there is a phase difference of 180 between a waveform in one sampling cycle and that in the other sampling cycle. With reference to FIGS. 6 and 7, the 2N signal cycles in time period T3 form one correlated double sampling cycle, and the two sampling cycles in the correlated double sampling cycle correspond to a sub-time period 31 and a sub-time period 32 respectively. It should be emphasized that since the number of the signal cycles in each of the two sampling cycles is equal, lengths of the sub-time period 31 and sub-time period 32 are equal. The phase difference between the waveform in the sub-time period 31 and the waveform in the sub-time period 32 is 180°.

The encoding information includes a plurality of encoding values, and each encoding value represents the phase condition of the driving signal applied to a certain driving channel in a certain sampling cycle. Since each sampling cycle corresponds to each sub-time period, it may also be understood that each encoding value represents the phase condition of the driving signal applied to the certain driving channel in the certain sub-time period. For example, in the time period T3, the driving signal applied to the driving channel TX1 changes from "+" to "+" and "−" (corresponding to the time periods 31 and 32 respectively), and the encoding values corresponding to the code matrix changes from "1" to "1" and "−1" (corresponding to the time periods 31 and 32 respectively). The driving signal applied to the driving channel TX2 changes from "+" to "+" and "−" (corresponding to the time periods 31 and 32 respectively), and the encoding values corresponding to the code matrix changes from "1" to "1" and "−1" (corresponding to the time periods 31 and 32 respectively). The driving signal applied to the driving channel TX3 changes from "+" to "+" and "−" (corresponding to the time periods 31 and 32 respectively), and the encoding values corresponding to the code matrix changes from "1" to "1" and "−1" (corresponding to the time periods 31 and 32 respectively). The driving signal applied to the driving channel TX4 changes from "−" to "−" and "+" (corresponding to the time periods 31 and 32 respectively), and the encoding values corresponding to the code matrix changes from "1" to "1" and "−1" (corresponding to the time periods 31 and 32 respectively). Similarly, the time period T0 is divided into the sub-time periods 01 and 02, the time period T1 is divided into the sub-time periods 11 and 12, and the time period T2 is divided into the sub-time periods 21 and 22. The driving signal and the encoding values in the encoding matrix are also changed accordingly. That is, in this embodiment, the encoding information in FIG. 6 is changed from the encoding information in FIG. 4, with the specific change mode that "+" in FIG. 4 changes to "+" and "−" (corresponding to the two sampling cycles in one correlated double sampling cycle), and "−" in FIG. 4 changes to "−" and "+" (corresponding to the two sampling cycles in one correlated double sampling cycle).

It should be further noted that in this embodiment, in the encoding information in a table form of FIGS. 4 and 6, "+" and "−" indicate that the phases of the driving signal are 0° and 180° respectively. In a specific calculation, the encoding information in the table form may be converted into the encoding information in a matrix form, that is, the encoding matrix. The encoding value "1" in the encoding matrix corresponds to "+" in the encoding information, and the encoding value "−1" in the encoding matrix corresponds to "−" in the encoding information. When the encoding information in the table form in FIGS. 4 and 6 is converted into the encoding matrix, "+" is represented by "1" and "−" is represented by "−1".

The encoding matrix A' includes a plurality of encoding values A'ij (i.e., A'011, A'012, A'013, A'014, A'021, A'022, . . . ), which represents the encoding information corresponding to the driving signals applied to the driving channels TX1 to TX4 in the encoding mode in this embodiment. The i in the A'ij represents the i-th sub-time period and j represents the j-th TX channel, and the value ranges here are i=01, 02, 11, 12, 21, 22, 31, 32 and j=1, 2, 3, 4;

$$A' = \begin{bmatrix} A'011 & A'012 & A'013 & A'014 \\ A'021 & A'022 & A'023 & A'024 \\ A'111 & A'112 & A'113 & A'114 \\ A'121 & A'122 & A'123 & A'124 \\ A'211 & A'212 & A'213 & A'214 \\ A'221 & A'222 & A'223 & A'224 \\ A'311 & A'312 & A'313 & A'314 \\ A'321 & A'322 & A'323 & A'324 \end{bmatrix}$$

In this example, the specific values of A' are as follows:

$$A' = \begin{bmatrix} -1 & 1 & 1 & 1 \\ 1 & -1 & -1 & -1 \\ 1 & -1 & 1 & 1 \\ -1 & 1 & -1 & -1 \\ 1 & 1 & -1 & 1 \\ -1 & -1 & 1 & -1 \\ 1 & 1 & 1 & -1 \\ -1 & -1 & -1 & 1 \end{bmatrix}$$

The demodulation matrix R' includes a plurality of demodulation values R'ij (i.e., R'11, R'12, R'13, R'14, R'21, R'22, . . . ). The i in the R'ij represents the i-th sub-time period and j represents the j-th RX channel, and the values of i and j in the R'ij are i=01, 02, 11, 12, 21, 22, 31, 32, j=1, 2, 3, 4. The demodulation matrix R' is represented as:

$$R' = \begin{bmatrix} R011 & R012 & R013 & R014 \\ R021 & R022 & R023 & R024 \\ R111 & R112 & R113 & R114 \\ R121 & R122 & R123 & R124 \\ R211 & R212 & R213 & R214 \\ R221 & R222 & R223 & R224 \\ R311 & R312 & R313 & R314 \\ R321 & R322 & R323 & R324 \end{bmatrix}$$

The capacitance matrix $C'=A'^{-1}R'$ is used to obtain the touch position information.

In this embodiment, those skilled in the art should know that the received sensing signal includes the low-frequency interference signal and a target signal that is obtained by coupling the driving signal. The signal cycle of the sensing signal is the same with that of the driving signal. The target signal has a phase shift with respect to the driving signal, and a phase shift difference between the waveform of the target signal and the waveform of the driving signal at the same time remains unchanged. For example, in the above examples, the signal cycle of the sine wave is 10 us (that is, the frequency of the driving signal is 100 kHz), then the signal cycle of the sensing signal is also 10 us. In one correlated double sampling cycle, if phases of waveforms of the driving signal in the two sampling cycles are 0° and 180° respectively, then in the two sampling cycles, the waveform of the target signal, for example, has a phase shift of 30° (here for example only, the phase shift is not limited to 30° and needs to be determined according to an actual situation), that is, phases of waveforms of the target signal in the two sampling cycles are 30° and 12° respectively. Therefore, the phase difference of 180° between a waveform of the target signal in one sampling cycle and that in other sampling cycle remains unchanged. However, the low-frequency interference signal may be considered to remain unchanged during the touch detection process since the touch detection time is relatively short, that is, the phase of the low-frequency interference signal in the two sampling cycles remains unchanged. Assuming that in one sampling cycle of the sensing signal, the target signal is S and the low-frequency interference signal is D, then in the correlated double sampling cycle, the demodulation values of the sensing signals in the two sampling cycles may be expressed as S+D and −S+D respectively if the driving signals in the two sampling cycles are a positive code and a negative code respectively. Then, the sensing signal in one correlated double sampling cycle may be obtained by a subtraction: (−S+D)−(S+D)=−2S, thus the target signal S may be obtained, that is, the target signal may be obtained more accurately by cancelling the low-frequency interference signal. In a process of solving the demodulation value in this embodiment, i.e. the above subtraction method is adopted to cancel the low-frequency interference signal, so the finally obtained data may be considered to include only the target signal S. Here, since the "+" or "−" for each encoding value in the encoding matrix A' is determined in accordance with whether the driving signal in each sub-time period is the positive code or the negative code, the demodulation value R'ij in the demodulation matrix is S+D or −S+D. Therefore, with respect to the capacitance matrix C'=A'$^{-1}$R', a matrix operation process here includes the process of canceling the low-frequency interference signal by the above subtraction method.

It should be noted that in the specific example in this embodiment, the number of the signal cycles in each of the two sampling cycles in the same correlated double sampling cycle is equal, so that the low-frequency interference signal in the sensing signal in the two sampling cycles may be completely cancelled as much as possible. However, this embodiment is not limited to thereto, and the number of the signal cycles in each of the two sampling cycles in the same correlated double sampling cycle may not be equal. Further, in a practical situation, due to the influence of the environment or other uncertain factors, there may be cases where the low-frequency interference signals in the two sampling cycles are not exactly the same no matter whether the number of the signal cycles in each of the two sampling cycles is equal or not. However, the touch detection method in this embodiment may still cancel at least a part of the low-frequency interference signal and improve the signal-to-noise ratio of the system.

A second embodiment of the present disclosure relates to a touch detection method, which is substantially the same with the first embodiment, with a main difference as follows: in the first embodiment, a plurality of signal waveforms of a driving signal are divided into one correlated double sampling cycle. However, in this embodiment, the plurality of the signal waveforms of the driving signal are divided into a plurality of correlated double sampling cycles, and the number of the signal cycles in each of the sampling cycles in each correlated double sampling cycle is 1.

Figure 8:
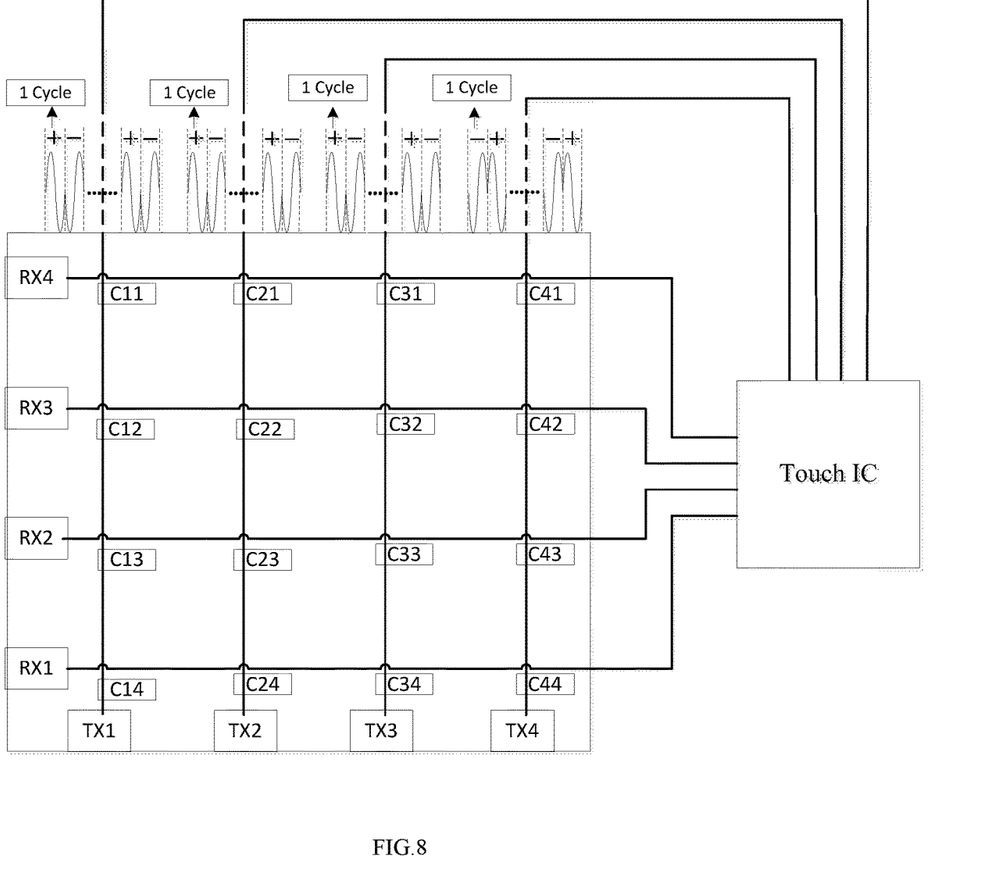
FIG. 8 is a schematic waveform diagram of a driving signal corresponding to an encoding information in a touch detection method in accordance with a second embodiment of the present disclosure.

FIG. 8 is a schematic waveform diagram of the driving signal corresponding to an encoding information in the touch detection method in the second embodiment. In FIG. 8, similar to the first embodiment, the driving signal also includes 2N signal waveforms (i.e., 2N signal cycles), and the 2N signal waveforms are divided into N correlated double sampling cycles. The number of the signal cycles in each of the two sampling cycles in each correlated double sampling cycle is 1. Here, the larger the value of N, the more the number of correlated double sampling cycles.

Figure 9:
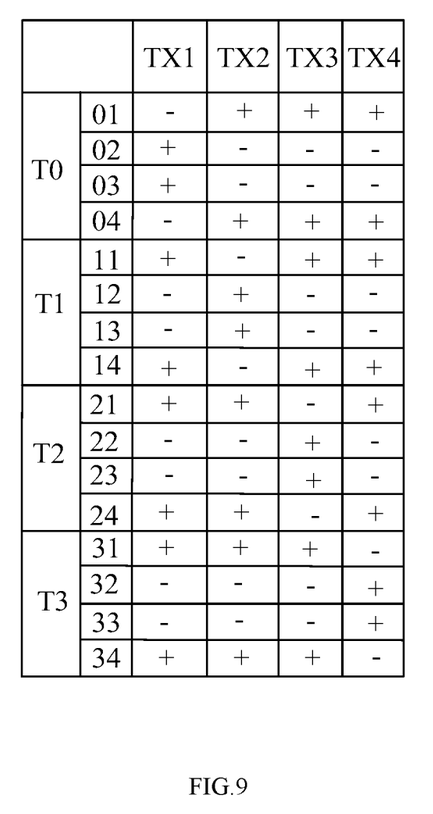
FIG. 9 is a schematic diagram of an encoding information when a driving signal is divided into 2 correlated double sampling cycles in a touch detection method in accordance with the second embodiment of the present disclosure.

FIG. 9 illustrates a schematic diagram of the encoding information when the N is equal to 4. Here, a time period T0 is evenly divided into four sub-time periods 01, 02, 03, and 04. Similarly, time periods T1, T2, and T3 are evenly divided into four sub-time periods.

This embodiment provides a specific implementation for the touch detection method. For the same driving signal (including the same number of signal waveforms), the larger the number of the correlated double sampling cycles are divided into, the more accurately the low-frequency interference signal in the sensing signal may be cancelled in the calculation process of the touch position information, that is, the stronger an ability in anti low-frequency interference.

A third embodiment of the present disclosure relates to a touch detection method, which is substantially the same with the second embodiment, with a main difference as follows: in the second embodiment, the number of signal cycles in each of the two sampling cycles in each correlated double sampling cycle is 1. However, in this embodiment, the number of the signal cycles in each of the two sampling cycles in each correlated double sampling cycle is greater than 1.

Figure 10:
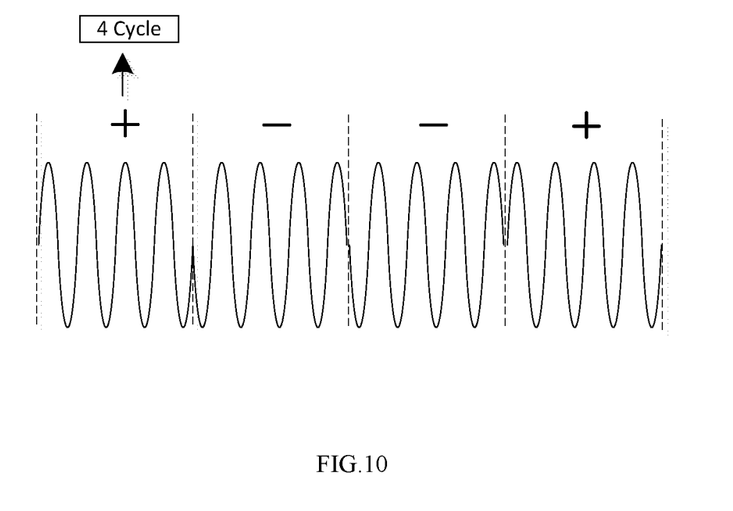
FIG. 10 is a schematic waveform diagram of a driving signal corresponding to an encoding information in a touch detection method in accordance with a third embodiment of the present disclosure.

FIG. 10 is a schematic waveform diagram of the driving signal corresponding to an encoding information in the touch detection method in the third embodiment. As in the second embodiment, the driving signal also includes 2N signal waveforms (i.e., 2N signal cycles). The 2N signal waveforms, for example, are divided into 2 correlated double sampling cycles, and the number of the signal cycles in each of the two sampling cycles in each correlated double sampling cycle is equal and N/4. In this example, the N is an even number greater than or equal to 8. For example, if N=16, the number of the signal cycles in each sampling cycle is 4 (4 Cycle as shown in FIG. 10). It should be noted that since the number of the signal cycles in each sampling cycle is large and there are a plurality of correlated double sampling cycles, only the waveform of the driving signal applied to the driving channel TX1 in the third time period T3 is illustrated in FIG. 10 in order to illustrate the waveform more clearly. The schematic diagram of the encoding information in this example may be referred to FIG. 9.

It should be noted that in this embodiment, the number of the signal cycles in each of the two sampling cycles in each correlated double sampling cycle is equal, but this embodiment is not limited thereto. Alternatively, the number of the signal cycles in each of the two sampling cycles in the same correlated double sampling cycle is equal, and the number of the signal cycles in each of the sampling cycles in different correlated double sampling cycles is not equal.

Figure 11:
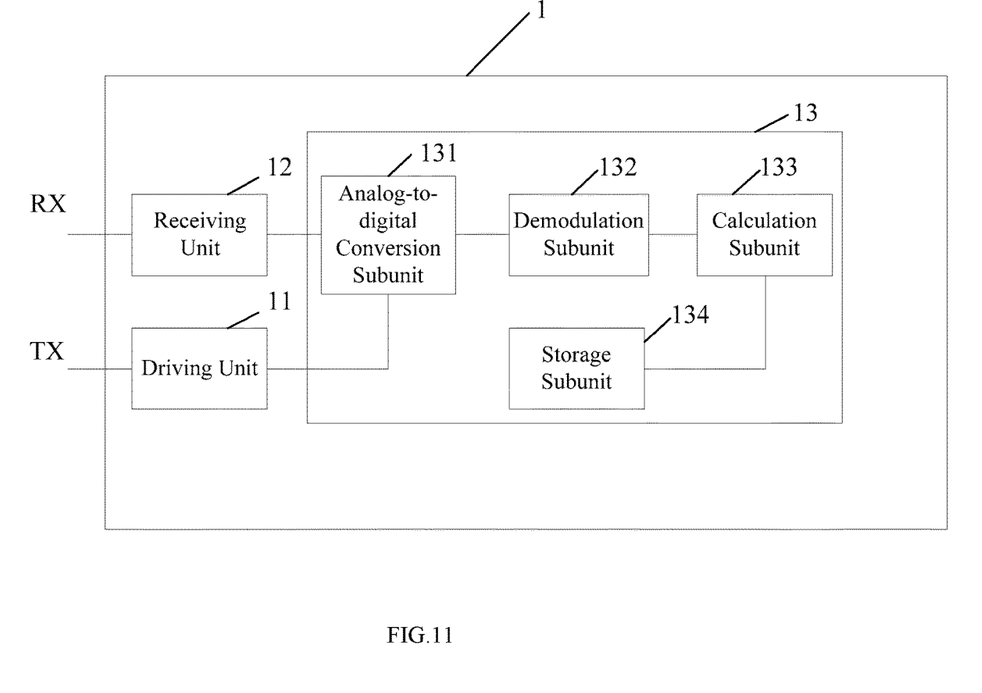
FIG. 11 is a block diagram of a touch chip in accordance with a fourth embodiment of the present disclosure.

A fourth embodiment of the present disclosure relates to a touch chip. As shown in FIG. 11, the touch chip 1 includes:

a driving unit 11, configured to apply a driving signal encoded based on a preset encoding mode to a driving channel of a touch screen, where the encoding mode includes dividing a plurality of signal waveforms of the driving signal into waveforms in at least one correlated double sampling cycle, the same correlated double sampling cycle including two sampling cycles with a phase difference of 180° between a waveform in one sampling cycle and that in the other sampling cycle;

a receiving unit 12, configured to receive a sensing signal that corresponds to the driving signal and that is from a sensing channel of the touch screen. The receiving unit 12 may be understood as including a signal conditioning circuit, where the signal conditioning circuit may include functions such as a signal amplification and a signal filtering. That is, the receiving unit 12 may perform some preprocessing on the sensing signal.

a processing unit 13, configured to determine a touch position information according to the sensing signal and according to the encoding mode corresponding to an encoding information.

Here, the processing unit 13 includes:

an analog-to-digital conversion subunit 131, configured to perform the analog-to-digital conversion on the sensing signal and to obtain the sensing signal in the digital form;

a demodulation subunit 132, configured to demodulate the sensing signal in the digital form and to obtain the demodulation information, wherein the waveform in each of the sampling cycles corresponds to one demodulation value in the demodulation information;

a calculation subunit 133, configured to calculate the touch position information according to the demodulation information and according to the encoding information corresponding to the encoding mode; and a storage subunit 134, configured to store the encoding information corresponding to the encoding mode.

In this embodiment, the driving unit 11 is connected to the analog-to-digital conversion subunit 131 in the processing unit 13 and is configured to synchronize the analog-to-digital conversion subunit 131. That is, when the driving unit 11 applies the driving signal to the driving channel, the analog-to-digital conversion subunit 131 is controlled to synchronously obtain the sensing signal in the digital form. In another example, the driving unit 11 may be connected with the analog-to-digital conversion subunit 131 and the receiving unit 12 at the same time, that is, the driving unit 11 may synchronize both the analog-to-digital conversion subunit 131 and the receiving unit 12.

Compared with existing technologies, a plurality of signal waveforms of the driving signal are divided into waveforms in at least one correlated double sampling cycle in embodiments of the present disclosure, the same correlated double sampling cycle including two sampling cycles with a phase difference of 180° between a waveform in one sampling cycle and that in the other sampling cycle. Those skilled in the art should know that the low-frequency interference signal may be considered to remain unchanged during a touch detection process since a touch detection time is relatively short. Moreover, those skilled in the art should also know that the sensing signal includes a target signal (i.e. a coupling signal of the driving signal) and the low-frequency interference signal, the target signal has a phase shift with respect to the driving signal, and a phase shift difference between the waveform of the target signal and the waveform of the driving signal at the same time remains unchanged. In the embodiment of the present disclosure, since in the two sampling cycles in one correlated double sampling cycle there is a phase difference of 180° between the waveform of the driving signal in one sampling cycle and that in the other sampling cycle, then with respect to the sensing signal sampled in the two sampling cycles, a phase difference of 180° between the waveform of the target signal in one sampling cycle and that in the other sampling cycle remains unchanged, and the phase of the low-frequency interference signal in each of the two sampling cycles is the same, so the low-frequency interferences in the two sampling cycles in the same correlated double sampling cycle may be cancelled by calculation, thereby improving an ability in anti low-frequency interference in the touch detection process, and improving a signal-to-noise ratio of a system and enhancing a touch sensitivity.

It is not difficult to find that this embodiment is a device embodiment corresponding to any one of the first to third embodiments, and this embodiment may be implemented in cooperation with any one of the first to third embodiments. The relevant technical details mentioned in any one of the first to third embodiments are still valid in this embodiment, and are not repeated here in order to reduce repetition. Accordingly, the relevant technical details mentioned in this embodiment may also be applied in any one of the first to third embodiments.

A fifth embodiment of the present disclosure relates to an electronic device which includes a touch screen and the touch chip described in the fourth embodiment.

Those skilled in the art should appreciate that the above-mentioned embodiments are specific examples for implementing the present disclosure. In practice, however, various changes may be made in forms and details of the specific embodiments without departing from the spirit and scope of the present disclosure.

What is claimed is:

1. A touch detection method, comprising:
   applying a driving signal to a driving channel of a touch screen, wherein the driving signal is encoded based on a preset encoding mode and includes a plurality of signal waveforms divided into waveforms in at least one correlated double sampling cycle, the same correlated double sampling cycle including two sampling cycles with a phase difference of 180° between a waveform in one sampling cycle and that in the other sampling cycle;
   receiving a sensing signal that corresponds to the driving signal and that is from a sensing channel of the touch screen; and
   determining a touch position information according to the sensing signal and according to an encoding information corresponding to the encoding mode.

2. The touch detection method in accordance with claim 1, wherein the number of signal cycles in each of the two sampling cycles in the same correlated double sampling cycle is equal, wherein one of the signal cycles corresponds to one of the signal waveforms.

3. The touch detection method in accordance with claim 2, wherein the plurality of signal waveforms are divided into waveforms in a plurality of correlated double sampling cycles, and the number of the signal cycles in each of the sampling cycles in each of the correlated double sampling cycles is equal.

4. The touch detection method in accordance with claim 3, wherein the number of the signal cycles in each of the sampling cycles in each of the correlated double sampling cycles is 1.

5. The touch detection method in accordance with claim 1, wherein the plurality of signal waveforms are divided into waveforms in one correlated double sampling cycle.

6. The touch detection method in accordance with claim 1, wherein determining the touch position information according to the sensing signal and according to the encoding information corresponding to the encoding mode comprises:
   performing an analog-to-digital conversion on the sensing signal and obtaining the sensing signal in a digital form;
   demodulating the sensing signal in the digital form and obtaining a demodulation information, wherein the waveform in each of the sampling cycles corresponds to one demodulation value in the demodulation information; and calculating the touch position information according to the demodulation information and according to the encoding information corresponding to the encoding mode.

7. The touch detection method in accordance with claim 1, wherein the touch screen comprises a driving layer and a sensing layer, wherein the driving layer includes a plurality of driving channels arranged in parallel along a first direction, and the sensing layer includes a plurality of sensing channels arranged in parallel along a second direction.

8. A touch chip, comprising:
a driving unit, configured to apply a driving signal to a driving channel of a touch screen, wherein the driving signal is encoded based on a preset encoding mode and includes a plurality of signal waveforms divided into waveforms in at least one correlated double sampling cycle, the same correlated double sampling cycle including two sampling cycles with a phase difference of 180° between a waveform in one sampling cycle and that in the other sampling cycle;
a receiving unit, configured to receive a sensing signal that corresponds to the driving signal and that is from a sensing channel of the touch screen; and
a processing unit, configured to determine a touch position information according to the sensing signal and according to an encoding information corresponding to the encoding mode.

9. The touch chip in accordance with claim 8, wherein the number of signal cycles in each of the two sampling cycles in the same correlated double sampling cycle is equal, wherein one of the signal cycles corresponds to one of the signal waveforms.

10. The touch chip in accordance with claim 9, wherein the plurality of signal waveforms are divided into waveforms in a plurality of correlated double sampling cycles, and the number of the signal cycles in each of the sampling cycles in each of the correlated double sampling cycles is equal.

11. The touch chip in accordance with claim 10, wherein the number of the signal cycles contained in each of the sampling cycles in each of the correlated double sampling cycles is 1.

12. The touch chip in accordance with claim 8, wherein the plurality of signal waveforms are divided into waveforms in one correlated double sampling cycle.

13. The touch chip in accordance with claim 8, wherein the processing unit comprises:
an analog-to-digital conversion subunit, configured to perform an analog-to-digital conversion on the sensing signal and obtaining the sensing signal in a digital form;
a demodulation subunit, configured to demodulate the sensing signal in the digital form and obtaining the demodulation information, wherein the waveform in each of the sampling cycles corresponds to one demodulation value in the demodulation information;
a calculation subunit, configured to calculate the touch position information according to the demodulation information and according to the encoding information corresponding to the encoding mode; and
a storage subunit, configured to store the encoding information corresponding to the encoding mode.

14. An electronic device, comprising: a touch screen and a touch chip, wherein the touch chip comprising:
a driving unit, configured to apply a driving signal to a driving channel of a touch screen, wherein the driving signal is encoded based on a preset encoding mode and includes a plurality of signal waveforms divided into waveforms in at least one correlated double sampling cycle, the same correlated double sampling cycle including two sampling cycles with phase difference of 180° between a waveform in one sampling cycle and that in the other sampling cycle;
a receiving unit, configured to receive a sensing signal that corresponds to the driving signal and that is from a sensing channel of the touch screen; and
a processing unit, configured to determine a touch position information according to the sensing signal and according to an encoding information corresponding to the encoding mode.

15. The electronic device in accordance with claim 14, wherein the number of signal cycles in each of the two sampling cycles in the same correlated double sampling cycle is equal, wherein one of the signal cycles corresponds to one of the signal waveforms.

16. The electronic device in accordance with claim 15, wherein the plurality of signal waveforms are divided into waveforms in a plurality of correlated double sampling cycles, and the number of the signal cycles in each of the sampling cycles in each of the correlated double sampling cycles is equal.

17. The electronic device in accordance with claim 16, wherein the number of the signal cycles contained in each of the sampling cycles in each of the correlated double sampling cycles is 1.

18. The electronic device in accordance with claim 14, wherein the plurality of signal waveforms are divided into waveforms in one correlated double sampling cycle.

19. The electronic device in accordance with claim 14, wherein the processing unit comprises:
an analog-to-digital conversion subunit, configured to perform an analog-to-digital conversion on the sensing signal and obtaining the sensing signal in a digital form;
a demodulation subunit, configured to demodulate the sensing signal in the digital form and obtaining the demodulation information, wherein the waveform in each of the sampling cycles corresponds to one demodulation value in the demodulation information;
a calculation subunit, configured to calculate the touch position information according to the demodulation information and according to the encoding information corresponding to the encoding mode; and
a storage subunit, configured to store the encoding information corresponding to the encoding mode.

* * * * *